United States Patent [19]

Lee

[11] Patent Number: 5,370,499

[45] Date of Patent: Dec. 6, 1994

[54] FILM COOLING OF TURBINE AIRFOIL WALL USING MESH COOLING HOLE ARRANGEMENT

[75] Inventor: Ching-Pang Lee, Cincinnati, Ohio

[73] Assignee: General Electric Company, Cincinnati, Ohio

[21] Appl. No.: 830,144

[22] Filed: Feb. 3, 1992

[51] Int. Cl.⁵ .............................................. B63H 1/14
[52] U.S. Cl. ................................ 416/97 R; 416/97 A
[58] Field of Search ........................ 476/97 R, 97 A

[56] References Cited

U.S. PATENT DOCUMENTS

| | | | |
|---|---|---|---|
| 3,527,543 | 8/1970 | Howald | 416/90 |
| 3,819,295 | 6/1974 | Hauser et al. | 416/97 |
| 3,934,322 | 1/1976 | Hauser et al. | 29/156.8 H |
| 4,162,136 | 7/1979 | Parkes | 416/97 R |
| 4,221,539 | 9/1980 | Corrigan | 416/97 A |
| 4,297,077 | 10/1981 | Durgin et al. | 416/97 R |
| 4,302,940 | 12/1981 | Meginnis | 416/97 A |
| 5,052,889 | 10/1991 | Abdel-Messeh | 416/97 R |
| 5,062,768 | 11/1991 | Marriage | 416/97 R |
| 5,288,207 | 2/1994 | Linask | 416/97 R |

FOREIGN PATENT DOCUMENTS 227582 7/1987 European Pat. Off. .......... 416/97 R

*Primary Examiner*—Peter A. Nelson
*Attorney, Agent, or Firm*—Jerome C. Squillaro; Nathan D. Herkamp

[57] ABSTRACT

A turbine airfoil has a mesh cooling hole arrangement which includes first and second pluralities of cooling holes extending between internal and external surfaces of an airfoil side wall at least at a pressure side and extending from an internal chamber to the airfoil exterior. The cooling holes of each plurality extend generally parallel to one another. The cooling holes of the first and second pluralities intersect so as to define a plurality of spaced apart internal solid nodes in the side wall having pairs of opposite sides interconnected by pairs of opposite corners. The spaced nodes define a multiplicity of hole portions of the cooling holes which extend between and along opposite sides of adjacent nodes and a plurality of flow intersections which interconnect the hole portions of the cooling holes and are disposed between the corners of adjacent nodes. The sides of the nodes have lengths which are greater than the widths of the hole portions between adjacent nodes such that, when cooling fluid is passed through the cooling holes, jet flow actions are created through the hole portions which in turn generate jet interactions at the flow intersections to cause restriction of air flow and produce a pressure drop. Also, the cooling holes have flow inlets at the internal surface and flow outlets at the external surface of the airfoil side wall. The area of the flow inlets is substantially less than the area of the flow outlets.

10 Claims, 2 Drawing Sheets

FILM COOLING OF TURBINE AIRFOIL WALL USING MESH COOLING HOLE ARRANGEMENT

CROSS REFERENCE TO RELATED APPLICATIONS

Reference is hereby made to the following copending U.S. patent applications dealing with related subject matter and assigned to the assignee of the present invention:

(1) "Cooling Hole Arrangement In Jet Engine Components Exposed To Hot Gas Flow" by Ching P. Lee et al, assigned U.S. Ser. No. 801,136 and filed Dec. 2, 1991, and now U.S. Pat. No. 5,326,224.

(2) "Internal Cooling of Turbine Airfoil Wall Using Mesh Cooling Hole Arrangement" by Ching P. Lee, assigned U.S. Ser. No. 830,145 and filed Feb. 3, 1992.

BACKGROUND OF THE INVENTION

1. Field of the Invention

The present invention relates generally to a gas turbine engine and, more particularly, to a turbine airfoil having a mesh arrangement of cooling holes for film cooling of the airfoil wall.

2. Description of the Prior Art

Gas turbine engines conventionally comprise an axial flow compressor which compresses air to the proper pressure required for supporting combustion of fuel in a combustion chamber. The combustion gases then pass to a turbine which powers the axial flow compressor. After passing through the turbine, the high energy combustion gas flow may be employed to drive a power turbine which is connected to an output shaft on which may be mounted a propeller, fan or other device. Alternatively, the high energy combustion gas flow may be utilized directly as a thrust to provide motive power, as in turbojet engines commonly used for aircraft.

It is well known that efficiency of turbine engines increases with increase in temperature of the combustion gas flow. A limiting factor in the gas flow temperature is the high temperature capability of the various turbine, stator and rotor, airfoils. As used herein, reference to a turbine airfoil includes both rotor blades and stator vanes. Various approaches to internally cooling the airfoils have been proposed to increase the upper operating temperature capability of the engines.

One advantageous approach is "external film cooling" of the airfoils. The term "external film cooling" refers to the technique of cooling the external surface of the airfoil by injecting a relatively cooled air along the external surface which moves sufficiently slow so that the layer acts as an insulative layer to reduce unwanted heating of the external surface of the airfoil by the adjacent hot gas flow stream.

It is conventional to provide discrete long film cooling holes through the wall of the airfoil to exhaust pressurized cooling air flow from an interior chamber of the airfoil through the airfoil wall to the exterior surface of the airfoil wall at the pressure and suction sides thereof. These discrete cooling holes through the airfoil wall provide film cooling on pressure and suction side external surfaces as well as internal convection cooling in the trailing edge. To prevent dust blockage, the cooling hole size has to be larger than a minimum requirement, such as approximately 0.010 inch in diameter. In order to conserve the consumption of cooling air flow, spacings between the discrete cooling holes are often not small enough to provide a uniform film and convection cooling coverage, especially in small airfoils. Therefore, it is desired to provide an arrangement of cooling holes which has adequate sizes of cross-sectional flow areas to prevent dust blockage and still provide a sufficient cooling coverage.

Some examples of different arrangements of film cooling holes proposed in the prior art are disclosed in U.S. patents Howald (U.S. Pat. No. 3,527,543), Corrigan (U.S. Pat. No. 4,221,539) and Durgin et al (U.S. Pat. No. 4,297,077). An example of a prior art arrangement of internal convection cooling holes in an airfoil trailing edge is disclosed in U.S. patents to Hauser et al (U.S. Pat. Nos. 3,819,295 and 3,934,322). Hauser et al disclose an internal convection cooling slot formed by first and second pluralities of parallel passages or holes extending from an internal chamber of the airfoil to the exterior of the trailing edge of the airfoil side wall. The pluralities of holes intersect one another so as to define spaced apart internal solid nodes in the airfoil trailing edge. The intersections of the pluralities of holes are areas of flow intersection. The length of the solid nodes in the cooling slot of Hauser et al is equal to or smaller than the width of the hole portions between the nodes. When cooling air is passed through the trailing edge of the airfoil side wall, the nodes act as turbulence promoters and area increasers for improving convective heat transfer between the airfoil and the cooling air. Also, the nodes positioned at the inlets and the outlets of the cooling holes of the Hauser et al patent are of the same size so that the inlet area of the cooling holes is the same as the outlet area thereof. In his construction, Hauser tried to simulate the pin-fin bank commonly employed on prior art airfoils wherein the trailing edge outlet holes were formed by an open slot with a plurality of spaced apart transverse pins.

Although the hole configurations of the cited patents are steps in the right direction for providing film and convective cooling of airfoils to increase the operating temperature and thereby the efficiency of the turbine engines, a need for additional improvement still remains.

SUMMARY OF THE INVENTION

The present invention provides a mesh cooling hole arrangement in a turbine airfoil which is designed to satisfy the aforementioned need. Like the cooling holes in the Hauser et al patents, the cooling holes in the mesh arrangement of the present invention include first and second pluralities of holes which intersect one another so as to define spaced apart internal solid nodes with the intersections of the pluralities of holes being areas of flow intersection.

However, unlike in the Hauser et al patents, the length of the solid nodes defined by the cooling holes in the mesh arrangement of the present invention is larger than the width of the hole portions between the nodes. Also, unlike in the Hauser et al patents, the nodes positioned at the inlets of the cooling holes of the mesh arrangement of the present invention are substantially greater in size than the nodes positioned at the outlets of the cooling holes so that the inlet area of the cooling holes is substantially less than the outlet area thereof.

Because of these differences between the cooling holes in the mesh arrangement of the present invention and the cooling holes in the cooling slot of the Hauser et al patent, when cooling air is passed through the mesh arrangement of cooling holes in the airfoil side wall, a jet flow action is created in the hole portions between the nodes which generates jet interactions at the flow intersections between the holes, restricting air flow and producing an effective pressure drop. Also, the jet interactions create turbulences which promote convective heat transfer between the airfoil and the cooling air. Because of its flow restriction characteristics, the mesh arrangement of cooling holes is ideal for any film cooling hole application as well as trailing edge cooling.

Also, the cooling holes of the mesh arrangement of the present invention can be of sufficient cross-sectional flow size to prevent dust blockage and still provide improved overall film cooling coverage and effectiveness and internal convection cooling area. The mesh arrangement of cooling holes are suitable for use in both large and small airfoils and can be either drilled or cast.

Accordingly, the present invention is set forth in a turbine airfoil having leading and trailing edges and opposite side walls defining pressure and suction sides and merging together at the leading and trailing edges. The side walls have internal surfaces defining a hollow interior chamber for communication of cooling air flow to the side walls. The side walls also have external surfaces spaced from the internal surfaces and extending generally in the direction of gas flow past the airfoil from the leading edge to the trailing edge of the airfoil.

The present invention is directed to a mesh cooling hole arrangement which comprises: (a) a first plurality of cooling holes extending generally parallel to one another between the internal and external surfaces of the airfoil side wall at least at the pressure side of the airfoil and extending from the internal chamber to the exterior of the airfoil; and (b) a second plurality of cooling holes extending generally parallel to one another between the internal and external surfaces of the airfoil side wall at least at the pressure side of the airfoil and extending from the internal chamber to the exterior of the airfoil. The cooling holes of the second plurality intersect the cooling holes of the first plurality so as to define a plurality of spaced apart internal solid nodes in the side wall which have pairs of opposite sides interconnected by pairs of opposite corners. The spaced nodes define a multiplicity of hole portions extending between and along the sides of adjacent nodes and a plurality of the flow intersections interconnecting the hole portions and disposed between the corners of adjacent nodes. The sides of the nodes have lengths greater than the widths of the hole portions between the nodes such that when cooling fluid is passed through the cooling holes in the airfoil side wall a jet flow action is created in the hole portions between the sides of adjacent nodes which generates jet interactions at the flow intersections between the corners of adjacent nodes to cause restriction of air flow and produce a pressure drop.

Also, the cooling holes of the first and second pluralities have flow inlets at the internal surface of the airfoil side wall and flow outlets at the external surface of the airfoil side wall. The ones of the nodes positioned adjacent to the cooling hole inlets are substantially greater in size than the nodes positioned adjacent the cooling hole outlets such that the area of the cooling hole inlets is substantially less than the area of the cooling hole outlets. The flow outlets of the cooling holes are displaced downstream of the flow inlets of the cooling holes relative to the direction of gas flow past the external surface of the side wall of the airfoil. Further, the cooling holes of the first and second pluralities extend in a common inclined plane relative to the external surface of the side wall of the airfoil and the direction of gas flow past the external surface of the side wall of the airfoil.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
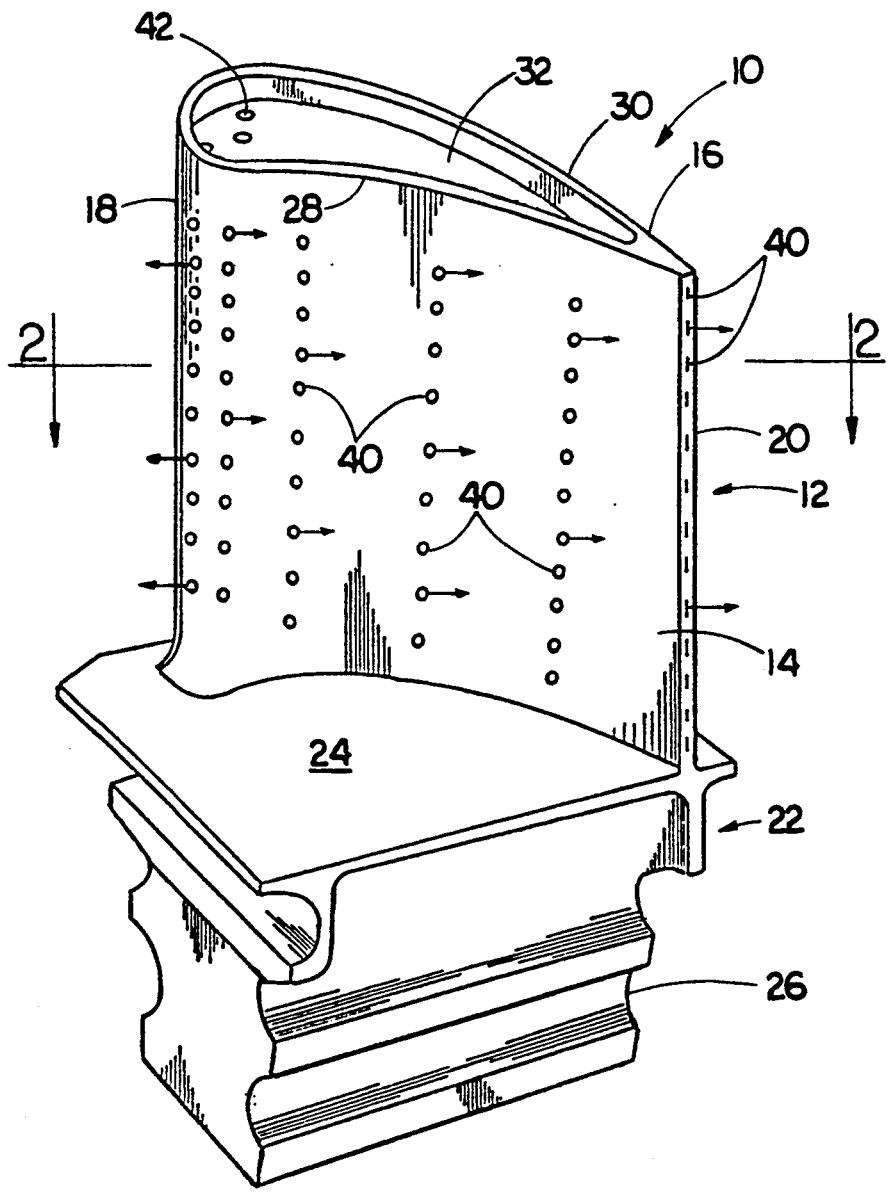
FIG. 1 is a perspective view of a prior art turbine engine blade having holes in the blade airfoil for exit of cooling air therefrom.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Turbine Engine Blade

Figure 2:
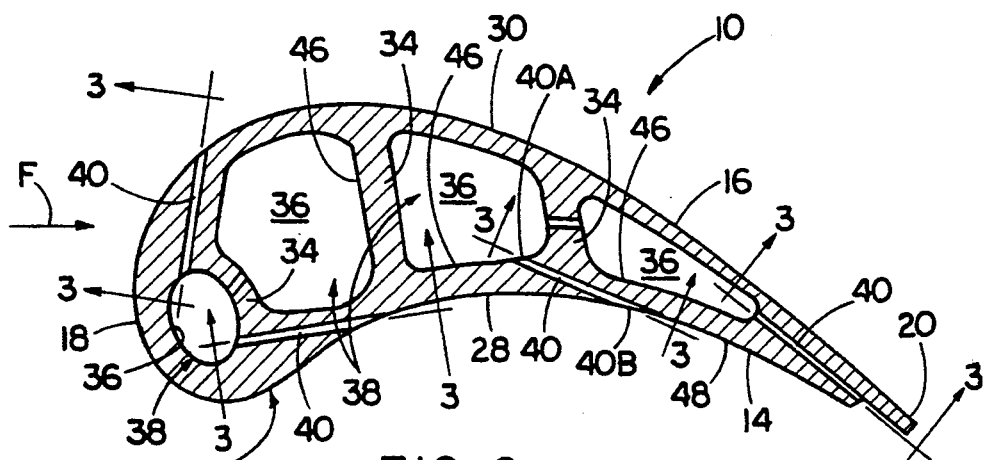
FIG. 2 is an enlarged cross-sectional view of the prior art blade airfoil taken along line 2—2 of FIG. 1.

Referring now to the drawings, and particularly to FIGS. 1 and 2, there is illustrated a prior art gas turbine engine hollow blade, generally designated 10. The hollow blade 10 includes an airfoil 12 having pressure and suction sides 14, 16 and leading and trailing edges 18, 20, and a base 22 mounting the airfoil 12 to a rotor (not shown) of the engine (not shown). The base 22 has a platform 24 rigidly mounting the airfoil 12 and a dovetail root 26 for attaching the blade 10 to the rotor.

The airfoil 12 has opposite side walls 28, 30 defining the pressure and suction sides 14, 16 of the airfoil 12 which merge together at the leading and trailing edges 18, 20 of the airfoil 12 and are rigidly attached upright on the platform 24. The airfoil 12 also has an end cap 32 which closes the outer ends of the side walls 28, 30. Also, the airfoil 12 includes a plurality of interior spaced ribs or transverse walls 34 which extend across the hollow interior of the airfoil 12 and rigidly interconnected with the opposite side walls 28, 30 so as to define a series of interior cavities 36 in the airfoil 12 in a hollow interior chamber 38 of the airfoil. As an example, the ribs 34 can extend vertically and alternately connect to and terminate short of the end cap 32 at their upper ends and of the platform 24 of the base 22. In such fashion, the ribs 34 define serpentine arrangements (not shown)

of cavities and passages within the interior of the airfoil 12.

Cooling air flows into and upwardly through the base 22 of the blade 10 to the airfoil 12 and therefrom along internal serpentine paths within the airfoil 12. The side walls 28, 30, and the end cap 32 of the airfoil 12 contain several pluralities of small apertures or holes 40 and 42 which permit passage and exit of cooling air from the interior to the exterior of the blade airfoil 12.

Figure 3:
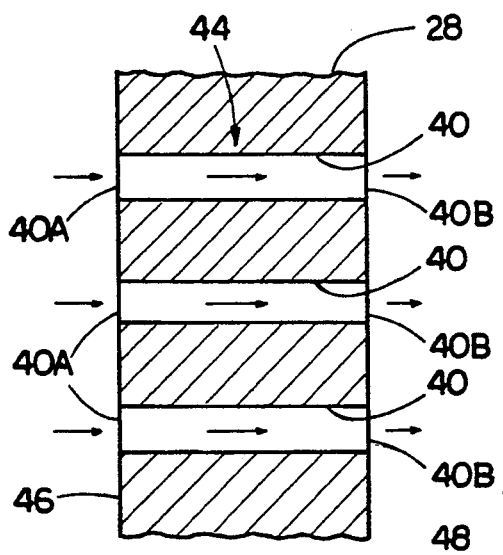
FIG. 3 is an enlarged longitudinal sectional view of the prior art airfoil taken along lines 3—3 of FIG. 2, showing a prior art parallel arrangement of spaced apart discrete cooling holes.

As seen in FIGS. 2 and 3, the cooling holes 40 of each plurality are elongated discrete cooling holes 40 disposed in a parallel arrangement 44 through the sidewalls 28, 30 of the airfoil 12 to exhaust pressurized cooling air flow from the interior chamber 38 to the exterior of the airfoil at the pressure and suction sides 14, 16 thereof. The parallel arrangement 44 of discrete cooling holes 40 of each plurality thereof through the airfoil sidewall 28, 30 provides film cooling on respective pressure and suction sides 14, 16 of the airfoil 12 as well as internal convention cooling in the trailing edge 20 of the airfoil. The cooling holes 40 achieve film cooling by entraining the cooling air exiting the holes 40 within a boundary layer of low velocity gas that exists between the airfoil exterior and hot combustion gases which are traveling at high velocity past the airfoil 12.

The cooling holes 40 of each plurality are typically of uniform circular cross-sectional size, and are substantially straight and equal to one another in axial length. The cooling holes 40 of each plurality also have flow inlets and outlets 40A, 40B respectively disposed at spaced internal and external surfaces 46, 48 of the airfoil 12. The flow inlets and outlets 40A, 40B have substantially the same areas. The flow outlets 40B are displaced downstream of the flow inlets 40A relative to the direction of gas flow F past the external surface 48 of the airfoil 12. Further, the cooling holes 40 of each plurality extending through the side walls 28, 30 are disposed in generally parallel spaced apart relation to one another and are aligned with one another in a plane extending in inclined relation relative to the external surface 48 of the side walls 28, 30 of the airfoil 12 and the direction F of gas flow past the external surface 48 of the side walls of the airfoil.

Mesh Cooling Hole Arrangement of Present Invention

Figure 4:
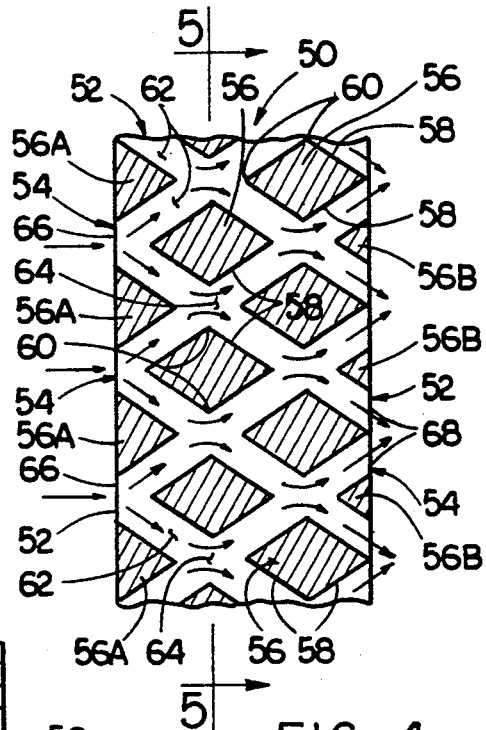
FIG. 4 is a view similar to that of FIG. 3, but illustrating a mesh cooling hole arrangement in accordance with the present invention.
Figure 5:
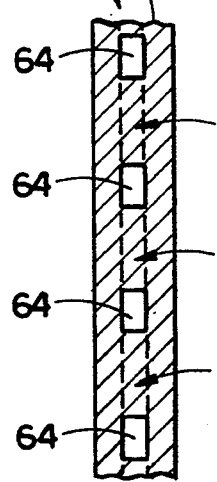
FIG. 5 is a longitudinal sectional view of the mesh cooling hole arrangement taken along line 5—5 of FIG. 4.

Referring to FIGS. 4 and 5, there is illustrated a mesh cooling hole arrangement, generally designated 50, provided through the side walls 28, 30 of the airfoil 12 in accordance with the present invention. The illustrated mesh cooling hole arrangement 50 is substituted in place of the prior art parallel arrangement 44 of discrete cooling holes 40 extending through the side walls 28, 30 of the blade airfoil 12 at each of the locations shown in FIG. 2. As will be explained below, the cooling holes of the mesh arrangement 50 have configurations which more effectively entrain the cooling air exiting the airfoil 12 in the boundary layer of low velocity gas flow and thereby more effectively provide the desired film cooling of the airfoil external surface 48 by avoiding blow-off and dissipation of the cooling air into the high velocity hot combustion gas flow F.

Referring to FIG. 4, the mesh cooling hole arrangement 50 includes first and second pluralities of cooling holes 52, 54 extending from the internal chamber 38 to the airfoil exterior, between the internal and external surfaces 46, 48 of the side wall 28 at least at the pressure side 14 and, preferably, also through the side wall 30 at the suction side 16 of the airfoil 12. Preferably, the cooling holes 52, 54 are of circular cross-section, however, they can be of any other cross-sectional configuration, such as rectangular, square, oval, etc. The cooling holes 52, 54 of each plurality extend generally parallel to one another. Also, the cooling holes 52, 54 of the first and second pluralities intersect so as to define a plurality of spaced apart internal solid diamond-shaped nodes 56 in the side wall 28, 30 having pairs of opposite sides 58 interconnected by pairs of opposite corners 60. The spaced nodes 56 define a multiplicity of hole portions 62 of the cooling holes 52, 54 which extend between and along the sides 58 of adjacent nodes 56 and a plurality of the flow intersections 64 which interconnect the hole portions 62 of the cooling holes 52, 54 and are disposed between the corners 60 of adjacent nodes 56. The sides 58 of the nodes 56 have lengths greater than the widths of the hole portions 62 between the adjacent node sides 58 so that, when cooling fluid or air is passed through the cooling holes 52, 54, jet flow actions are created through the hole portions 62 between the sides 58 of adjacent nodes 56 which, in turn, generate jet interactions at the flow intersections 64 between the corners 60 of adjacent nodes 56 to cause restriction of air flow and produce a pressure drop.

Also, the cooling holes 52, 54 have flow inlets 66 at the internal surface 46 and flow outlets 68 at the external surface 48 of the airfoil side walls 28, 30. The ones 56A of the nodes 56 which are positioned adjacent the cooling hole inlets 66 are substantially greater in size than the ones 56B of the nodes 56 positioned adjacent the cooling hole outlets 68. Thus, the area of the cooling hole inlets 66 is substantially less than the area of the cooling hole outlets 68.

Also, the flow outlets 68 of the cooling holes 52, 54 are displaced downstream of the flow inlets 66 thereof relative to the direction of gas flow F past the external surface 48 of the side walls 28, 30 of the airfoil 12. Further, the cooling holes 52, 54 of both pluralities are aligned in a common plane which is inclined relative to the external surface 48 of the respective side walls 28, 30 of the airfoil 12 and the direction of gas flow F past the external surface 48 of airfoil side walls 28, 30. Also, the flow outlets 68 of the cooling holes 52, 54 are aligned in a row extending in generally transverse relation to the direction of gas flow F past the external surface 48 of the respective side wall 28, 30 of the airfoil 12. Finally, the intersecting cooling holes 52, 54 are substantially straight and equal to one another in axial length and are substantially uniform in cross-sectional size.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. In a turbine airfoil having leading and trailing edges and opposite side walls defining pressure and suction sides and merging together at said leading and trailing edges, said side walls having internal surfaces defining a hollow interior chamber for communication of cooling air flow to said side walls, said side walls having external surfaces spaced from the internal surfaces and extending generally in the direction of gas flow past said airfoil from said leading edge to said trailing edge of said airfoil, a mesh cooling hole arrangement comprising:

(a) a first plurality of cooling holes extending generally parallel to one another between said internal and external surfaces of said side wall at least at said pressure side of said airfoil and from said internal chamber to the exterior of said airfoil; and (b) a second plurality of cooling holes extending generally parallel to one another between said internal and external surfaces of said side wall at least at said pressure side of said airfoil and from said internal chamber to the exterior of said airfoil;

(c) said cooling holes of said second plurality intersecting said cooling holes of said first plurality so as to define a plurality of spaced apart internal solid nodes in said side wall having pairs of opposite sides interconnected by pairs of opposite corners, a multiplicity of hole portions extending between and along opposite sides of adjacent nodes and a plurality of the flow intersections interconnecting said hole portions and disposed between said corners of adjacent nodes;

(d) said sides of said nodes having lengths greater than the widths of said hole portions between said nodes such that when cooling fluid is passed through said first and second pluralities of cooling holes in said airfoil side wall a jet flow action is created in said hole portions between said sides of adjacent nodes which generates jet interactions at said flow intersections between said corners of adjacent nodes to cause restriction of air flow and produce a pressure drop.

2. The arrangement as recited in claim 1, wherein said cooling holes of said first and second pluralities have flow inlets at said internal surface of said airfoil side wall and flow outlets at said external surface of said airfoil side wall, the ones of said nodes being positioned adjacent said cooling hole inlets being substantially greater in size than said nodes positioned adjacent said cooling hole outlets such that the area of said cooling hole inlets is substantially less than the area of said cooling hole outlets.

3. The arrangement as recited in claim 2, wherein said flow outlets of said cooling holes are displaced downstream of said flow inlets of said cooling holes relative to the direction of gas flow past said external surface of said side wall of said airfoil.

4. The arrangement as recited in claim 1, wherein said cooling holes of said first and second pluralities extend in inclined relation relative to said external surface of said side wall of said airfoil and the direction of gas flow past said external surface of said side wall of said airfoil.

5. The arrangement as recited in claim 1, wherein said flow outlets of said cooling holes of said first and second pluralities are aligned in a row extending in generally transverse relation to the direction of gas flow past said external surface of said side wall of said airfoil.

6. The arrangement as recited in claim 1, wherein said cooling holes of said first and second pluralities are aligned with one another in a plane extending in inclined relation relative to said external surface of said side wall of said airfoil and the direction of gas flow past said external surface of said side wall of said airfoil.

7. The arrangement as recited in claim 1, wherein said cooling holes of said first and second pluralities are substantially straight and equal to one another in axial length.

8. The arrangement as recited in claim 1, wherein said cooling holes of said first and second pluralities are substantially uniform in cross-sectional size.

9. In a turbine airfoil having leading and trailing edges and opposite side walls defining pressure and suction sides and merging together at said leading and trailing edges, said side walls having internal surfaces defining a hollow interior chamber for communication of cooling air flow to said side walls, said side walls having external surfaces spaced from the internal surfaces and extending generally in the direction of gas flow past said airfoil from said leading edge to said trailing edge of said airfoil, a mesh cooling hole arrangement comprising:

(a) a first plurality of cooling holes extending generally parallel to one another between said internal and external surfaces of said side wall at least at said pressure side of said airfoil and from said internal chamber to the exterior of said airfoil; and (b) a second plurality of cooling holes extending generally parallel to one another between said internal and external surfaces of said side wall at least at said pressure side of said airfoil and from said internal chamber to the exterior of said airfoil;

(c) said cooling holes of said second plurality intersecting said cooling holes of said first plurality so as to define a plurality of spaced apart internal solid nodes in said side wall having pairs of opposite sides interconnected by pairs of opposite corners;

(d) said cooling holes of said first and second pluralities having flow inlets at said internal surface of said airfoil side wall and flow outlets at said external surface of said airfoil side wall, ones of said nodes being positioned adjacent said cooling hole inlets being substantially greater in size than ones of said nodes being positioned adjacent said cooling hole outlets such that the area of said cooling hole inlets is substantially less than the area of said cooling hole outlets.

10. The arrangement as recited in claim 9, wherein said flow outlets of said cooling holes are displaced downstream of said flow inlets of said cooling holes relative to the direction of gas flow past said external surface of said side wall of said airfoil.

* * * * *